April 20, 1965      H. E. SHOEMAKER      3,179,722
METHOD OF PREPARING SPHERICAL NUCLEAR FUEL PARTICLES
Filed April 2, 1962
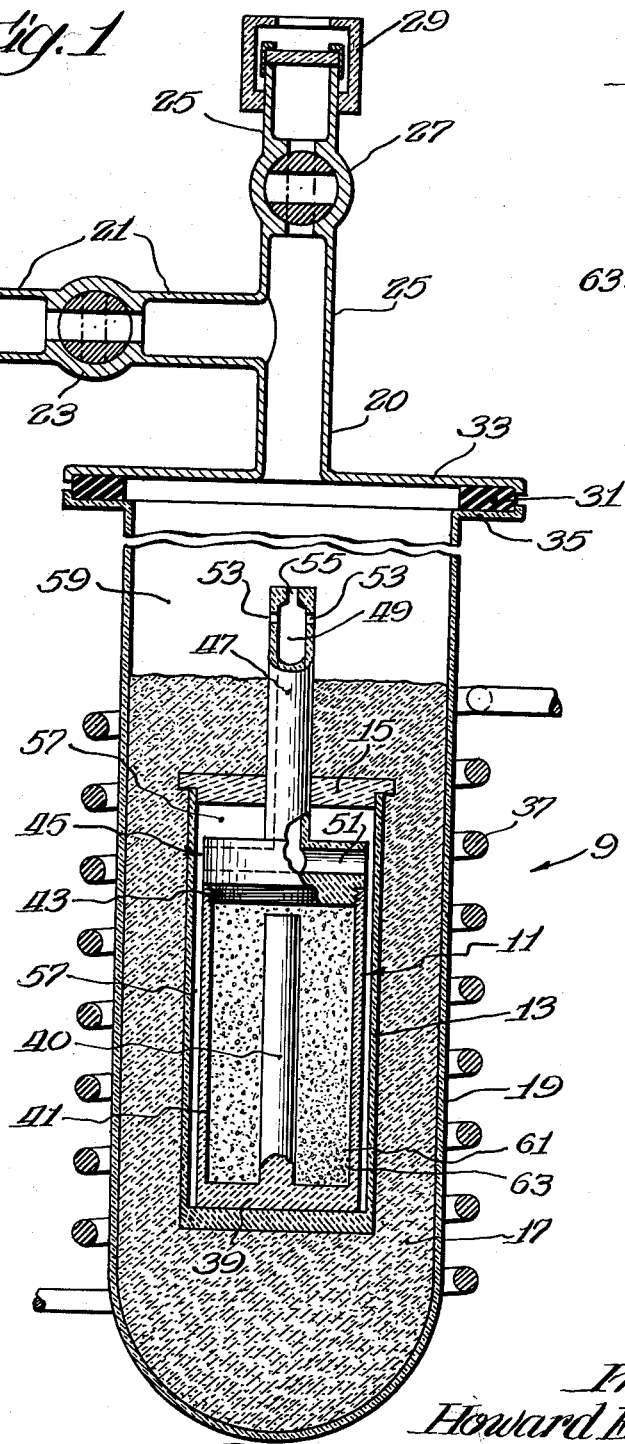
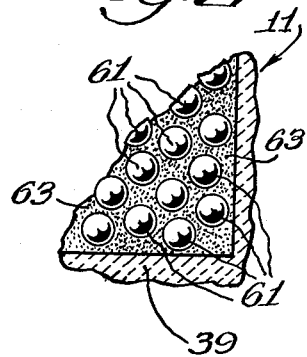
Inventor:
Howard E. Shoemaker
By Roland A. Anderson
Attys.

United States Patent Office 3,179,722
Patented Apr. 20, 1965

3,179,722
METHOD OF PREPARING SPHERICAL
NUCLEAR FUEL PARTICLES
Howard E. Shoemaker, San Diego, Calif., assignor, by mesne assignments, to the United States of America as represented by the United States Atomic Energy Commission
Filed Apr. 2, 1962, Ser. No. 184,612
12 Claims. (Cl. 264—15)

The present invention generally relates to nuclear fuel and more particularly relates to a method of preparing nuclear fuel carbides in spheroidized particulate form.

Various procedures have been proposed for the preparation of nuclear fuel carbides, some of which procedures involve the preparation of the carbides in particulate form. In this connection, what is meant, for the purposes of the present invention, by nuclear fuel carbides are the monocarbides and dicarbides of thorium, uranium and plutonium and mixtures thereof. Procedures for the preparation of nuclear fuel carbides, however, are generally relatively costly and time consuming, particularly those where the particles are to be of relatively uniform size and shape, such procedures usually requiring shaping operations, before and after formation of the carbides and/or the use of complicated equipment.

Nuclear fuel carbides are preferred materials for use in fuel elements of various types of nuclear reactors. In certain of such reactors, it is advantageous from a nuclear standpoint to provide the fuel carbides in dense particulate form of uniform diameter, i.e., in the form of spheroids or pellets of controlled size. It would therefore be advantageous to provide a low cost simplified procedure for the production of dense, particulate nuclear fuel carbides of controlled size and shape. Such a low cost, simplified relatively rapid method utilizing a minimum of steps has now been discovered.

Accordingly, the principal object of the present invention is to provide a method for the manufacture of nuclear fuel carbides in dense, particulate form and of controlled size and shape. It is also an object of the present invention to produce dense particles of carbides of thorium plutonium and uranium and mixtures thereof of controlled diameter in a minimum number of steps over a relatively short period of time. Further objects and advantages of the present invention will be apparent from a study of the following detailed description and of the accompanying drawings of which:

FIGURE 1 is a vertical section of one form of apparatus in which the method of the present invention can be conveniently carried out, portions of internal components of the apparatus being broken away to illustrate the construction thereof; and, FIGURE 2 is an enlarged fragmentary view of fuel pellets formed by the method of the present invention in place in a portion of the apparatus of FIGURE 1.

The method of the present invention generally comprises spheroidizing particles of nuclear fuel carbides without agglomeration thereof. Preferably, nuclear fuel particles are utilized which are not initially in carbide form, but which during the processing are converted to the carbide form and then are spheroidized, all within a graphite bed at elevated temperature. The finished spheroidized nuclear fuel carbide particles are dense, of controlled size and may contain an adherent protective layer of carbon or graphite on the outer surface thereof.

Now referring in more detail to the steps of the method of the present invention, nuclear fuel in powdered or fine granular form is mixed together with carbon or graphite powder. The nuclear fuel may comprise thorium, uranium or plutonium in unenriched or enriched forms, and mixtures thereof. Preferably, the fuel is in oxide form, as for example, thorium dioxide or uranium dioxide or mixture thereof, although nuclear fuel in metallic form or in carbide form or in a mixture of two or three of the indicated forms is not excluded from the scope of the present invention.

Carbon preferably used with the nuclear fuel instead of graphite and may be any suitable carbon powder, preferably reactor grade powder such as is used for critical facility nuclear reactor compacts and the like. A sufficient amount of carbon is mixed with the nuclear fuel to convert the same during subsequent processing to the carbide form, preferably the dicarbide form, and to preferably form an eutectic mixture therewith. It will be understood that where the nuclear fuel is initially in carbide form, the carbon can be eliminated from the mixture. However, nuclear fuel carbide formation during rather than before the processing is preferred, as previously indicated.

A small concentration, for example about 2 percent or more, of a suitable binder material, is added to the mixture, preferably ethyl cellulose of suitable viscosity, but various other resinous binder such as polyvinyl alcohol, shellac, Lucite, Bakelite, furfural alcohol resin, paraffin, etc., can be successfully used in small concentrations. It will be understood that the relative proportions of the nuclear fuel, carbon and binder can be somewhat varied, depending upon the results desired. Preferred compositions for various nuclear purposes, utilizing preferred constituents are set forth in the following table:

*Table I*

| | Constituents | Concentrations, gms. | Produced Carbides |
|---|---|---|---|
| (1) | $UO_2$ | 85.0 | $UC_2$. |
| | Carbon | 15.1 | |
| | Ethyl Cellulose | 2 | |
| (2) | $ThO_2$ | 85.0 | $ThC_2$. |
| | Carbon | 15.5 | |
| | Ethyl Cellulose | 2 | |
| (3) | $ThO_2$ | 80.0 | $ThC_2$—$UC_2$ (Th:U=10:1). |
| | $UO_2$ | 8.0 | |
| | Carbon | 16.0 | |
| | Ethyl Cellulose | 2 | |
| (4) | $ThO_2$ | 70.0 | $ThC_2$—$UC_2$—C eutectic (Th:U=10:1). |
| | $UO_2$ | 7.0 | |
| | Carbon | 16.7 | |
| | Ethyl Cellulose | 2 | |
| (5) | $ThO_2$ | 56.0 | $ThC_2$—$UC_2$—C eutectic (Th:U=4.5:2). |
| | $UO_2$ | 25.0 | |
| | Carbon | 17.5 | |
| | Ethyl Cellulose | 2 | |

In accordance with the method of the present invention, the indicated constituents are thoroughly mixed together and particulated to suitable particle size. Thus, the nuclear fuel, carbon (when used) and binder can be mixed together dry and then a suitable volatilizable solvent for the binder, preferably trichloroethylene in the case of ethyl cellulose, can be added to dissolve the binder and to form a slurry of the constituents. The solvent can be evaporated, as mixing is carried out, so that thorough mixing of the constituents together with agglomeration thereof into particles can thereby be effected.

The described, preferred mixing and agglomerating procedure can be carried out in any suitable apparatus. One particularly suitable type of apparatus for relatively large batches containing more than about three thousand grams of mix is known as a PK Twin Shell blender. Such apparatus can be advantageously used, as for example, as follows: A 3 kilogram batch of dry powders (nuclear fuel oxide and carbon, plus about 60 grams ethyl cellulose binder) is loaded into the blender and blending is affected for about 30 minutes at low speed, after which approximately 850 ml. of trichloroethylene can be added slowly to the blender as, for example, over a 45 minute period. Blnding is continued until the desired particle size for the mix is obtained. Some control of particle size can be achieved by regulating the concentration of the solvent added to the blender.

Where smaller batches of particles are to be prepared from the indicated dry powder, a smaller size mixer, as for example a Hobart mixer, can be used. An example of such use is as follows: Powder batches of less than 3 kilograms are added in dry powder form first to the PK blender and blended dry for 30 minutes. The mixed powders are then transferred to the Hobart mixer and an amount of trichloroethylene proportional to that indicated with respect to the PK blender is added to produce a slurry while the Hobart mixer is operated at a low speed. When the mix ceases to stick to the walls of the mixer the speed is increased and mixing is conducted until small balls of the mix are obtained and no dust is evident in the mix. Thereafter, the balled mix is transferred to the PK blender and blended until the desired particle size is obtained or, alternatively, it can be left in the Hobart mixture and mixing carried on until the desired particle size is obtained.

The particles obtained from the described mixing and agglomerating operation are preferably of from about 300 to 500 micron size. They are then removed from the mixer and oven dried, for example, at 140° F. then sieved to obtain the desired particle size for further processing, for example from about 295 to 495 microns (+48—38 mesh) size, i.e., about 75 microns larger than the desired size of the finished spheroidized fuel pellets. Particles outside the desired size limit range can be recycled through the described mixing operations by adding more trichloroethylene or other suitable solvent for the binder. In the event that the PK blender is used for the recycling, it is advantageous to first reduce the particles to powder form before adding the trichlorethylene.

The pre-sized agglomerated fuel-containing particles so produced are then mixed with or uniformly dispersed in a sufficient amount of graphite flour, preferably in a particle-to-graphite ratio of about 8:1, so that the particles are out of physical contact with one another. Other ratios with relatively more graphite can be utilized but it has been found for most purposes it is desirable to have at least one part, by weight, of graphite present to eight parts, by weight, of the fuel-containing particles.

In accordance with the method of the present invention, the mixture or dispersion of the fuel-containing particles and graphite flour is placed in a reaction zone and heated in an at least substantially oxygen-free environment, preferably in a vacuum, to convert the fuel to carbide form, if not already in that form, and to spheroidize the fuel particles. This treatment can be conveniently carried out in a graphite crucible disposed within a suitable high temperature apparatus. However, other comparable high temperature apparatus can also be employed.

FIGURE 1 of the accompanying drawings illustrates one form of suitable apparatus for carrying out the carburizing and spheroidizing steps of the present method.

Now referring to FIGURE 1, a reaction apparatus 9 is illustrated which includes a graphite crucible 11 loosely disposed within a graphite susceptor 13 fitted with a carbon cap 15. The susceptor is in turn disposed within a carbon black insulator bed 17 in the bottom portion of a quartz reaction tube 19. Tube 19 is fitted with a centrally disposed line 20, to which are connected a vacuum line 21 with valve 23, and a third line 25 with valve 27 and sight glass 29, as shown in FIGURE 1. A rubber gasket 31 seals the cover 33 of tube 19 to the flanged upper end of the subwall 35 thereof. An induction heating coil 37 is disposed around the lower portion of tube 19 to bring the crucible 11 to reaction temperature.

The graphite crucible 11 is generally cylindrical and includes a bottom portion 39 with an integral centrally disposed vertically extending graphite heat distribution core 40. Sidewall 41 of crucible 11 is integrally connected to bottom 39. To the upper end of sidewall 41 is releasably secured, as by threads 43, a graphite cap 45.

Cap 45 is provided with an upwardly extending, hollow chimney 47, the cavity 49 therein interconnecting with a horizontally extending cavity 51 in the cap 45, as shown in FIGURE 1. Chimney 47 extends up through the carbon cap 15 and terminates above the level of the carbon black insulator 17 in quartz tube 19. Adjacent its upper end, chimney 47 is provided with a plurality of horizontal vent holes 53 interconnecting with cavity 49 and with a vertical sight hole 55 aligned with line 20, line 25, valve 27 and sight glass 29.

With such an arrangement, the chimney 47 serves two purposes. It conducts reaction gases out of reaction zone, and it provides means whereby pyrometer readings can be made to determine the temperature in crucible 11.

Thus, reaction gases (such as carbon monoxide, etc., resulting from reduction of fuel oxides with carbon), migrate out of crucible 11 through the walls thereof into the space 57 between crucible 11 and susceptor 13, then through cavity 51 into cavity 49 of chimney 47. Such gasses pass up through cavity 48, out of the chimney through holes 53 and 55 into the space 59 above the level of the carbon black insulator bed in tube 19. Such gases are removed from space 59 through line 20, exhaust line 21 and valve 23.

It is, of course, important to have accurate determinations of crucible 11 temperature during processing in accordance with the present method. Pyrometric measurements of crucible 11 can be periodically made on a direct line through sight glass 29, valve 27, line 25, line 20, sight hole 55, cavity 49 and the in-line portion of cavity 51, as shown in FIGURE 1. Such measurements may be carried on optically or otherwise, in accordance with known principles based upon the high temperature characteristics of black bodies, crucible 11 acting as a black body.

In utilizing the described apparatus, the mixture of graphite flour and agglomerated nuclear fuel-containing particles is placed within crucible 11 to fill the same. Cap 45 is then screwed tightly in place. The crucible is then positioned within susceptor 13 and the susceptor cap 15 is fitted into place. The susceptor is then positioned within the carbon black insulator bed 17 in tube 19, as shown in FIGURE 1, with the upper end of chimney 47 above the level of bed 17. Gasket 31 is put in place and cover 33 is disposed therearound. Valve 23 is then opened and a vacuum is drawn through line 21 to remove oxygen from the system. If desired, the system can be flushed with inert gas or reducing gas and vacuum can then be applied.

When substantially all oxidizing gas has thus been removed from the system, crucible 11 is gradually heated to sintering and carburizing temperature. Preferably, high vacuum is applied (for example, below 200–300 microns pressure) throughout the heating procedure so as to remove any evolved gases from the system. In most cases, the sintering and carburizing temperatures can be from about 2000 to about 2300° C., such temperatures being reached over a heating period of, for example, 2 to 5 hours. The particular temperatures selected will depend on the particular constituents utilized as the nuclear fuel components. Generally, the higher the concentration of thorium in a thorium-uranium mixture (oxide form) the higher the carburizing temperature required. A temperature range of 2000 to 2300° C., is suitable, for example, for nuclear fuel particles containing an atom ratio of thorium-to-uranium of about 4.5:2. Reduction of the nuclear fuel oxides to the dicarbides is accomplished at the indicated sintering and carburizing temperature, i.e., carbide formation is effected, accompanied by evolution of reaction gases ($CO$, $CO_2$, etc.). Carburizing and sintering temperature is maintained in the crucible until carbide formation is completed. The desired carbide formation can be detected by a reduction in the pressure in the system, since reaction gases no longer are evolved. It will be understood that the carburizing step does not take place where the nuclear fuel of the particles being treated is initially in the dicarbide form. At any rate, during heating of the particles, pyrolysis of the binder in the particles occurs with some evolution of gases, usually well below the indicated carburizing temperatures. These gases are drawn off through the vacuum line, as described with respect to the carbide reaction gases.

Whether the nuclear fuel carbides in the fuel particles are initially present or whether they are formed in situ at carburizing temperature, in accordance with the present method the temperature in the crucible is ultimately raised to above the melting point of the highest melting point carbides or eutectic mixture, when present, in the particles, preferably to above 50° C., above such melting point. Usually, such temperature will be around 2500° C., but this will depend on the particular composition of the fuel particles. The melting point of the fuel particles can be detected during the heating operation since, at such melting point, gas is suddenly substantially evolved therefrom (voids between the sub particles of the sintered particles are filled with molten carbides, entrained gases are expelled, etc.). There also is an accompanying arrest in the rate of temperature rise in the system, due to utilization of heat for fusion or transition of the particles from solid to liquid form. Vacuum is applied to the system during such further heating. After such temperature is reached, it need only be maintained for a relatively short period of time, for example, 15 to 30 minutes, that is, only long enough to assure complete melting of the carbides of all fuel particles in the crucible.

Thus, each of the fuel particles, while being maintained separate from all other fuel particles in the crucible by the graphite flour, is melted. The melting results in an increase in the density of each fuel particle over that of the same particle in the sintered carburized form. Moreover, each melted fuel particle 61 assumes a spherical shape, as shown in FIGURE 2 since it is suspended in the graphite flour 63 and does not agglomerate with other melted fuel particles 61 in the crucible 11 due to the presence of the graphite flour 63 physically separating it from all other nuclear fuel particles 61.

The densified, spheroidized fuel particles are then gradually cooled to ambient temperature, preferably with the aid of a cooling gas, for example in an atmosphere of methane or other hydrocarbon gas. Thereafter, the apparatus is disassembled and the sealed crucible is transferred to an inert dry atmosphere, wherein the crucible is disassembled and the particles are removed and sieved or otherwise suitably separated (as by blowing, etc.) from the graphite flour. For example, the particles can be sieved through 35 and 100 mesh screens. Material retained on the 100 mesh screen is of about 150–420 microns in diameter. The small percentage of oversized material greater than 35 mesh may be stored for fuel reprocessing, while the small percentage of undersized material which passes through the 100 mesh screen along with graphite powder can be reused, for example, as graphite insulation, etc. In most cases, the yield of 150–420 micron size spheroidized nuclear fuel carbide particles exceeds 99 percent of the particles treated by the present method, so that the method is very efficient. The finished nuclear fuel carbide particles thus produced are dense, substantially spherical and usually contain a thin covering of adherent graphite which has the beneficial function of acting as a barrier against migration of fission products from the nuclear fuel during use thereof in a nuclear reactor at elevated temperatures. The finished particles are ready for immediate use in nuclear fuel elements and the like, but can, if desired, be further treated as by coating the surfaces thereof with pyrolytic carbon or the like.

Inasmuch as enriched nuclear fuel, containing, for example, uranium 235, is more expensive than unenriched nuclear fuel and inasmuch as some loss of nuclear fuel from the nuclear fuel particles to the surrounding graphite may be encountered during the described high temperature processing, it is perferred to "break in" the crucible and graphite flour prior to their use with enriched nuclear fuel particles by first using them in the described method with unenriched nuclear fuel particles. This has the effect of outgassing the graphite flour and crucible graphite and of saturating the same with unenriched nuclear fuel (thorium 232, uranium 238, etc.) so that during subsequent processing with enriched nuclear fuel, such enriched fuel will not be lost to the graphite.

The following examples further illustrate certain features of the present invention:

EXAMPLE I

A 1200 gm. batch of nuclear fuel particle mix was prepared utilizing the constituents specified in Table II below.

*Table II*

| Constituents: | Parts by weight |
|---|---|
| Thorium dioxide | 56 |
| Uranium dioxide | 25 |
| Carbon | 17.5 |
| Ethyl cellulose | 2 |

The constituents were mixed together dry for 30 minutes and then trichlorethylene was slowly added to a total amount of about 340 ml. Mixing was continued until small particles were obtained. The particles were then oven dried at 140° F. and sieved to obtain 295–495 micron size particles. The particles were then mixed with graphite flour in an 8-to-1 particle-to-graphite weight ratio (about 150 gm. of graphite flour), placed in a graphite crucible of a reaction apparatus, substantially as shown in FIGURE 1 of the accompanying drawing, and heated therein to 2300° C. over a 3 hour period after evacuation of the apparatus to below 200 microns. Such low pressure was maintained until carbide formation in the particles was complete. The temperature was then raised to about 2500° C. while maintaining pressure below 300 microns, and held for 15 minutes, after which the system was cooled to ambient temperature with methane.

The crucible was then removed to an inert atmosphere and therein opened. The particles were sieved using 35 and 100 mesh screens and those particles (over 99 percent) 150–420 microns in size were retained. The retained particles were examined and found to be dense, hard, graphite coated, generally spherical and particularly suitable for use in high temperature nuclear reactors. The nuclear fuel of the particles was found to be essentially completely in the dicarbide form.

EXAMPLE II

Spheroidized, hard, dense nuclear fuel carbide particles are prepared substantially as described in Example I utilizing the same constituents, concentrations, etc., except that the nuclear fuel is thorium dicarbide and uranium dicarbide and no free carbon is present in the mix. During the heat treatment, the temperature of the particles is gradually raised without interruption to 2550° C. and that temperature is maintained for 20 minutes. Following the cooling and sieving steps, the finished particles are examined and found to have substantially the same characteristics as the finished particles of Example I.

Accordingly, an improved method for the manufacture of dense, hard spheroidized nuclear fuel carbide particles in unagglomerated form from nuclear fuel is provided, which method is efficient, relatively simple and relatively rapid. The finished particles are ready for use in high temeprature nuclear reactors without further treatment. Other advantages are as set forth in the foregoing.

Various of the features of the present invention are set forth in the appended claims.

What is claimed is:

1. A method of preparing dense, spheroidized unagglomerated nuclear fuel carbide particles, which method comprises the steps of mixing together material including particulate nuclear fuel and carbonizable binder, the mixture containing an amount of carbon at least equivalent to the amount of nuclear fuel metal in said nuclear fuel, particulating said mixture and uniformly dispersing the resultant particles in a sufficient amount of particulate graphite so as to maintain said fuel particles out of physical contact with each other in said graphite, disposing said dispersion in a reaction zone, and heating said fuel particles in said zone in a substantially oxygen-free environment to above the melting point of nuclear fuel carbides, maintaining said fuel particles at said temperature until said fuel particles have melted and have spheroidized, and thereafter cooling said fuel particles to solidify the same, whereby dense, hard, spheroidized, unagglomerated nuclear fuel carbide particles are provided.

2. A method of preparing dense, hard, unagglomerated, spheroidized nuclear fuel carbide particles, which method comprises the steps of uniformly mixing together material including nuclear fuel and carbonizable binder for said fuel, the mixture including a concentration of carbon at least equivalent to the concentration of metal of said nuclear fuel, slurrying said mixture in a volatilizable solvent for said binder and particulating said mixture during evaporation of said solvent, uniformly dispersing the resultant particles of from about 300 to 500 micron size in a sufficient concentration of particulate graphite so as to maintain said fuel particles out of physical contact with each other in said flour, disposing said dispersion in a reaction zone, and heating said fuel particles in said zone in a substantially oxygen-free environment to above the melting point of nuclear fuel carbides of said fuel particles, maintaining said fuel particles at said temperature until substantially all of said fuel particles have melted and have spheroidized, and thereafter cooling said fuel particles to solidify the same, whereby dense, hard, spheroidized, unagglomerated nuclear fuel carbide particles are provided.

3. A method of preparing dense, spheroidized, unagglomerated nuclear fuel carbide particles, which method comprises the steps of mixing together particulate nuclear fuel oxide, particulate carbon in a concentration at least sufficient to form dicarbide with substantially all of said nuclear fuel and carbonizable binder, particulating said mix, uniformly dispersing the resultant particles of from about 300 to 500 micron size in particulate graphite so as to maintain said fuel particles out of physical contact with each other in said graphite, disposing said dispersion in a reaction zone, and heating said fuel particles in said zone in a substantially oxygen-free environment to carburizing temperature for said nuclear fuel, maintaining said particles at said temperature until carburization is at least substantially completed, and thereafter increasing the temperature in said reaction zone to above the melting point of the nuclear fuel carbides formed in situ in said particles, maintaining said fuel particles at said temperature until said fuel particles have melted and have spheroidized, and thereafter cooling said fuel particles to solidify the same, whereby dense, hard, spheroidized, unagglomerated nuclear fuel carbide particles are provided.

4. A method of preparing dense, spheroidized, unagglomerated nuclear fuel carbide particles, which method comprises the steps of mixing together particulate nuclear fuel oxide, particulate carbon in a concentration sufficient to form dicarbide with substantially all of said nuclear fuel, and carbonizable binder, slurrying said mixture in a solvent for said binder and particulating said mixture during evaporation of said solvent, uniformly dispersing the resultant fuel particles of from about 300 to 500 micron size in a concentration of graphite flour sufficient to maintain said fuel particles out of physical contact with each other in said bed, disposing said dispersion in a reaction zone and heating said fuel particles in said zone in a vacuum to carburizing temperature for said nuclear fuel, maintaining said fuel particles at said temperature until carburization is substantially completed and thereafter increasing the temperatures of said particles to above the melting point of the nuclear fuel carbides formed in situ in said fuel particles, maintaining said fuel particles at said temperature until substantially all of said particles have melted and have spheroidized, thereafter cooling said particles to solidify the same and, separating said solidified particles from non-adhering graphite flour, whereby dense, hard, spheroidized, unagglomerated nuclear fuel carbide particles are provided.

5. The method of claim 4 wherein said nuclear fuel oxide comprises uranium oxide.

6. The method of claim 4 wherein said nuclear fuel oxide comprises thorium oxide.

7. The method of claim 5 wherein said nuclear fuel oxide also includes thorium oxide, wherein the particulate carbon is present with the nuclear fuel in a concentration sufficient to provide an eutectic mixture of nuclear fuel carbides, and wherein said binder comprises ethyl cellulose.

8. A method of preparing dense, spheroidized, unagglomerated nuclear fuel carbide particles, which method comprises the steps of mixing together particulate nuclear fuel carbide and carbonizable binder, particulating said mixture and uniformly dispersing the resultant fuel particles of from about 300 to 500 micron size in particulate graphite so as to maintain said fuel particles out of physical contact with each other in said graphite, disposing said dispersion in a reaction zone and heating said fuel particles in said zone in a substantially oxygen-free environment to above the melting point of the nuclear fuel carbides of said fuel particles, maintaining said particles at said temperature until substantially all of said particles have melted and have spheroidized, and thereafter cooling said particles to solidify the same, whereby dense, hard, spheroidized, unagglomerated nuclear fuel carbide particles are provided.

9. A method of preparing dense, spheroidized, unagglomerated nuclear fuel carbide particles, which method comprises the steps of mixing together particulate nuclear fuel carbide and carbonizable binder, slurrying said mix in a volatilizable solvent for said binder, and particulating said mixture while evaporating said solvent, uniformly dispersing the resultant particles of from about 300 to 500 micron size in a concentration of graphite flour sufficient to maintain said particles out of physical contact with each other in said flour, disposing said dispersion in a reaction zone, and heating said particles in said zone in a vacuum to above the melting point of the nuclear fuel carbides of said particles, maintaining said particles at said temperature until substantially all of said particles have melted and have spheroidized, thereafter cooling said particles to solidify the same and separating said solidified particles from non-adherent graphite flour, whereby dense, hard, spheroidized, unagglomerated nuclear fuel carbide particles are provided.

10. The method of claim 9 wherein said nuclear fuel carbide comprises uranium carbide.

11. The method of claim 9 wherein said nuclear fuel carbide comprises thorium carbide.

12. The method of claim 10 wherein said nuclear fuel carbide also includes thorium carbide and wherein said binder comprises ethyl cellulose.

References Cited by the Examiner

UNITED STATES PATENTS

| | | | |
|---|---|---|---|
| 2,460,977 | 2/49 | Davis et al. | 65—21 |
| 2,461,011 | 2/49 | Taylor et al. | 65—21 |
| 2,719,786 | 11/55 | Fredenburgh | 75—223 |
| 3,031,389 | 4/62 | Goeddel et al. | 106—43 |
| 3,129,188 | 4/64 | Sowman et al. | 23—14.5 |

OTHER REFERENCES

AEC Report ORNL 1633, December, 1953, pp. 1–4.

"Progress in Nuclear Energy," vol. 5 (Metallurgy & Fuels), edited by Finniston & Howe, Permagon Press, N.Y., 1956, pp. 435, 436, and 443.

AEC Report TID 7546 (Book 2), November 1957, pp. 532 and 3.

AEC Report BMI, 1357, June 1959, pp. 86 and 87.

CARL D. QUARFORTH, *Primary Examiner*.

REUBEN EPSTEIN, OSCAR R. VERTIZ, *Examiners*.